(12) United States Patent
Suzuki et al.

(10) Patent No.: US 6,567,216 B2
(45) Date of Patent: May 20, 2003

(54) POLARIZATION ELEMENT OF AN IRRADIATION DEVICE FOR POLARIZED LIGHT FOR OPTICAL ALIGNMENT OF A LIQUID CRYSTAL ALIGNMENT LAYER

(75) Inventors: Shinji Suzuki, Yokohama (JP); Sayu Yamada, Yamato (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 31 days.

(21) Appl. No.: 09/902,604

(22) Filed: Jul. 12, 2001

(65) Prior Publication Data
US 2002/0044236 A1 Apr. 18, 2002

(30) Foreign Application Priority Data
Jul. 12, 2000 (JP) .......................... 2000-211186

(51) Int. Cl.⁷ .......................... G02B 5/30; G02F 11/337
(52) U.S. Cl. .................. 359/487; 359/488; 359/501; 349/124
(58) Field of Search .................. 349/96, 110, 124, 349/1; 359/487, 488, 500, 501, 586, 587, 614; 362/19, 268; 430/20, 321

(56) References Cited

U.S. PATENT DOCUMENTS 5,934,780 A * 8/1999 Tanaka .................. 362/19
6,190,016 B1 * 2/2001 Suzuki et al. .................. 362/19

FOREIGN PATENT DOCUMENTS

| EP | 0 913 720 | 5/1999 |
| EP | 1 020 739 A2 | 7/2000 |
| JP | 10-90684 | 4/1998 |
| JP | 10-090684 | 4/1998 |
| JP | 11-202335 | 7/1999 |

OTHER PUBLICATIONS

Yoneno et al., "High Definition Front Projector Using Poly–Si TFT LCD", 147–150, 1991, Conference Record of the 1991 Int'l Display Research Conference.

* cited by examiner

Primary Examiner—James Dudek
Assistant Examiner—Tai Duong
(74) Attorney, Agent, or Firm—Nixon Peabody LLP; David S. Safran

(57) ABSTRACT

A polarization element in which glass plates are inclined at the Brewster angle with respect to the optical axis of the incident light beam and are combined with one another in a V-shape, has a light shielding plate at the light incidence side of the polarization element along a centerline thereof to reduce the S-polarized light which passes therethrough and to increase the extinction ratio of the polarized light which emerges from the polarization element. This light shielding plate shields the light which is reflected by the glass plates. In this way, the S-polarized light which is reflected by the surface of the glass plates is not incident in the opposite glass plates. Therefore, the S-polarized light passing through the polarization element can be reduced and the adverse effect of the above described reflection light on the extinction ratio can be reduced. A light shielding plate can be provided for each of the several glass plates which are combined with one another in a V-shape.

6 Claims, 10 Drawing Sheets

POLARIZATION ELEMENT OF AN IRRADIATION DEVICE FOR POLARIZED LIGHT FOR OPTICAL ALIGNMENT OF A LIQUID CRYSTAL ALIGNMENT LAYER

BACKGROUND OF THE INVENTION

1. Field of the Invention

The invention relates to a polarization element of a light irradiation device for optical alignment of liquid crystals in which the alignment layer of a liquid crystal cell element is irradiated with polarized light. The invention relates especially to a polarization element which is suitable for optical alignment of a wide-view film.

2. Description of Related Art

A liquid crystal cell element is produced as follows:

An alignment layer formed on the surface of a transparent substrate is treated for alignment of the liquid crystals in a desired direction (alignment treatment).

Two of these transparent substrates are cemented to one another such that the alignment layers are located on the inside and a gap with a stipulated distance is maintained between the two substrates.

Liquid crystals are injected into this gap. For the above described alignment treatment of the alignment layer of a liquid crystal cell element, there is a technique which is called "optical alignment". Here, an alignment layer is irradiated with polarized light and exposed.

An irradiation device for polarized light for optical alignment is disclosed, for example, from the Japanese patent disclosure document HEI 10-90684.

Recently the above described irradiation device for polarized light is being used more and more often to produce a wide-view film, besides for production of the above described liquid crystal cell element. A wide-view film is produced as follows:

Liquid crystals which can be cured using UV light are applied to a base film.

Liquid crystal molecules are aligned in a certain direction.

Afterwards the liquid crystals are cured by UV irradiation so that the direction of the liquid crystal molecules is fixed.

By cementing a wide-view film onto a liquid crystal cell, a reduction of the image quality can be equalized, i.e., the field of view of LCDs can be enhanced.

Conventionally, the above described process of "alignment of the liquid crystal molecules in a certain direction" is carried out by rubbing. But recently, it is being done more and more often using the above described irradiation with polarized light and by optical alignment.

FIG. 7 shows the arrangement of an irradiation device for polarized light which optically aligns a wide-view film according to the example. In the figure, a discharge lamp 1, such as a super high pressure mercury lamp or the like, is located in an oval focusing mirror 2, and directs light from the lamp to a first planar mirror 3 from which it passes through a polarization element 8, an integrator lens 4, and a shutter 5 to a second planar mirror which deflects the light to a collimation lens 7. These components make up the irradiation device for polarized light.

In the polarization element 8, several glass plates are inclined by the Brewster angle with respect to the optical axis of the incident light beam and are located parallel to one another at intervals. These glass plates are combined with one another in a V-shape and are arranged such that the light exit side becomes convex.

When a polarization element is used which is made of glass plates which have been combined in a V-shape, the advantages are the following:

The size of the entire polarization element (the size in the lengthwise direction with respect to the optical axis) can be reduced more than in the case in which the glass plates are not combined in a V-shape.

The size of the individual glass plate becomes smaller.

The production costs per glass plate become smaller.

Two directions for the arrangement of the polarization element formed of glass plates which have been combined in a V-shape can be imagined, i.e., the direction in which the exit side is convex, and the direction in which the incidence side is convex. FIG. 7 shows a polarization element in which the exit side is convex (in which the light is incident from the direction in which the glass plates form a "valley").

The number of glass plates used for the polarization element is not limited to the number in the drawings, but it can be set suitably according to the desired illuminance on a surface to be irradiated and according to the extinction ratio.

In the figure, the light which is emitted from the discharge lamp 1 and which contains UV radiation is focused by the oval focusing mirror 2, reflected by the first plane mirror 3 and is incident in the polarization element 8. The polarization element 8 passes P-polarized light and reflects most of the S-polarized light. The light emerging from the polarization element 8 therefore becomes mainly P-polarized light. The light emerging from the polarization element 8 is incident in the integrator lens 4.

The light emerging from the integrator lens 4 is reflected via the shutter 5 and by the second plane mirror 6, is converted into parallel light by means of the collimation lens 7 and is emitted onto a wide-view film 10 to which liquid crystals which can be cured with UV light have been applied. The concept of "wide-view film 10" is defined below as a film to which liquid crystals which can be cured with UV light have been applied.

The wide-view film 10 is wound in the manner of a roll as an endless workpiece with a great length onto a take-off roller 11a. After the wide-view film which has been wound onto the take-off roller 11a has been unwound and irradiated with polarized light, it is wound onto the take-up roller 11b, as is shown in the drawings. During transport of the film 10 the polarized light is emitted onto the film 10 with a pre-set angle.

It is known that the above described wide-view film is also aligned at a poor extinction ratio of the polarized light (for example, P-polarized light to S-polarized light=3:1 to 2:1). Polarized light with this extinction ratio can also be obtained without using an optical element such as a collimator or the like.

In FIG. 7, the polarization element 8 is located between the first plane mirror 3 and the integrator lens 4. But, as shown in FIG. 8, the polarization element 8 can be located on the exit side of the collimation lens 7.

FIG. 9 shows another example of the arrangement of an irradiation device for polarized light for optical alignment of a wide-view film. In this embodiment, a rod-shaped tube lamp 21, for example a high pressure mercury lamp or a metal halide lamp is located at the focal point of a trough-like mirror 22 with a cross section which is a parabola. In the polarization element 8', as in the polarization element 8 shown in FIG. 7, several glass plates are inclined by the Brewster angle with respect to the optical axis of the incident light beam and are arranged parallel to one another at intervals. These glass plates are combined with one another in a V-shape and are arranged such that the light exit side becomes convex.

The wide-view film 10, as was described above, is an endless workpiece of great length that is wound as a roll onto the take-off roller 11a. After the wide-view film which has been wound onto the take-off roller 11a has been unrolled and irradiated with polarized light, it is wound onto the take-up roller 11b as is shown in the drawings. During transport of the film 10, the polarized light is emitted onto the film 10 at a pre-set angle.

In the irradiation device for polarized light shown in FIG. 9, the directly projected light from the lamp is scattered light. Therefore, light with a non-Brewster angle is incident in the polarization element. Furthermore, there is also light which passes through the polarization element without polarization separation.

However, the light which has been reflected by the trough-shaped mirror 22 is converted essentially into parallel light and is incident with the Brewster angle in the polarization element, by which it is subjected to polarization separation. As a result P-polarized light emerges. Therefore, light emerges from the polarization element which, for the most part, has a large proportion of P-polarized light and which is emitted onto the wide-view film 10.

The reason for using such a rod-shaped lamp is that a wide surface can be irradiated with high illuminance, that the film exposure rate is increased, and that the throughput is improved, compared to the case in which the point light source shown in FIGS. 7 & 8 is used.

If, as was described above, a polarization element is used in which several glass plates are inclined with respect to the optical axis of the incident light beam at the Brewster angle and are arranged spaced parallel to one another, and in which the glass plates are combined with one another in a V-shape, the advantages are the following:

The size of the entire polarization element can be reduced.
The size of the individual glass plate becomes smaller.
Production costs per glass plate become less.

If the polarization element in which the glass plates are combined with one another in a V-shape is used and if this polarization element is arranged such that the light exit side becomes convex, the disadvantages are the following:

FIG. 10 shows a polarization element in which glass plates are combined with one another in a V-shape. Here, four sets of glass plates 8a which have been combined with one another in a V-shape are used, and thus, a polarization element is formed.

The respective glass plate 8a is inclined with respect to the incident light by the Brewster angle and is arranged such that the exit side becomes convex. In FIG. 10, the arrows to the top and bottom and the circles with the black dots in the middle label the polarization directions of the P-polarized light and the S-polarized light. As is shown in the drawings, on the exit side of the polarization element 8, a shadow is formed by the refraction of the glass plates. In fact, 15 sets of glass plates are used. However, in FIG. 10, only four sets of glass plates are represented and the others are omitted.

As is shown in FIG. 10, the light which is incident in the glass plates with the Brewster angle is separated into P-polarized light and S-polarized light. The P-polarized light is passed by the glass plates while the S-polarized light is reflected. The S-polarized light reflected by the surface of the glass plate is incident in the opposite glass plate. Since the light incident in this glass plate from the above described reflected light (of the S-polarized light) does not have the Brewster angle, it passes through the glass plate even if it is S-polarized light.

The S-polarized light which has passed though this glass plate is reflected by the surface of the second glass plate in the same way and transmitted and is likewise reflected by the surface of the third and other glass plates in the same way and transmitted. This repetition ultimately yields S-polarized light which passes through the polarization element. As a result this light becomes "stray light," by which the extinction ratio of the polarized light which emerges from the polarization element is reduced.

SUMMARY OF THE INVENTION

An object of the invention is to eliminate the above described defects of the prior art.

More specifically, it is an object of the invention is to prevent the S-polarized light reflected from the surface of a glass plate from being incident in an opposite glass plate, thus to reduce the S-polarized light which passes through the polarization element, and to increase the extinction ratio of the polarized light which emerges from the polarization element.

The above objects and others are achieved in accordance with the invention as follows:

(1) A polarization element is used in which several glass plates are inclined at the Brewster angle with respect to the optical axis of the incident light beam and are located parallel to one another at spaced intervals, and in which these glass plates are combined with one another V-shaped polarization element that is arranged such that the light exit side is convex. On the light incidence side of this polarization element, along the edge line, there is a light shielding component, this edge line being formed by the crossing of the light incidence surfaces of the above-described two sets of V-shaped glass plates. The light shielding component is essentially parallel to the optical axis of the incident light such that the light which is incident in the above described glass plate with the Brewster angle is not hindered. The light shielding component shields the S-polarized light which is reflected by the above described glass plate.

By the arrangement of the above described light shielding component the S-polarized light reflected by the surface of the glass plate is absorbed or reflected by the light shielding plate and is not incident in the opposite glass plate. As a result, the S-polarized light which passes through the polarization element can be diminished. Thus, the adverse effect of the above described reflection light on the extinction ratio can be reduced.

(2) In (1), there is the above described light shielding component for each of the several glass plates which are combined with one another in a V-shape.

In this way, the S-polarized light which is reflected by the several glass plates which are combined with one another in a V-shape can be completely shielded, and thus, the adverse effect of the above described reflection light on the extinction ratio can be reduced even more.

The invention is explained in detail below using several embodiments shown in the drawings.

DETAILED DESCRIPTION OF THE INVENTION

Figure 1:
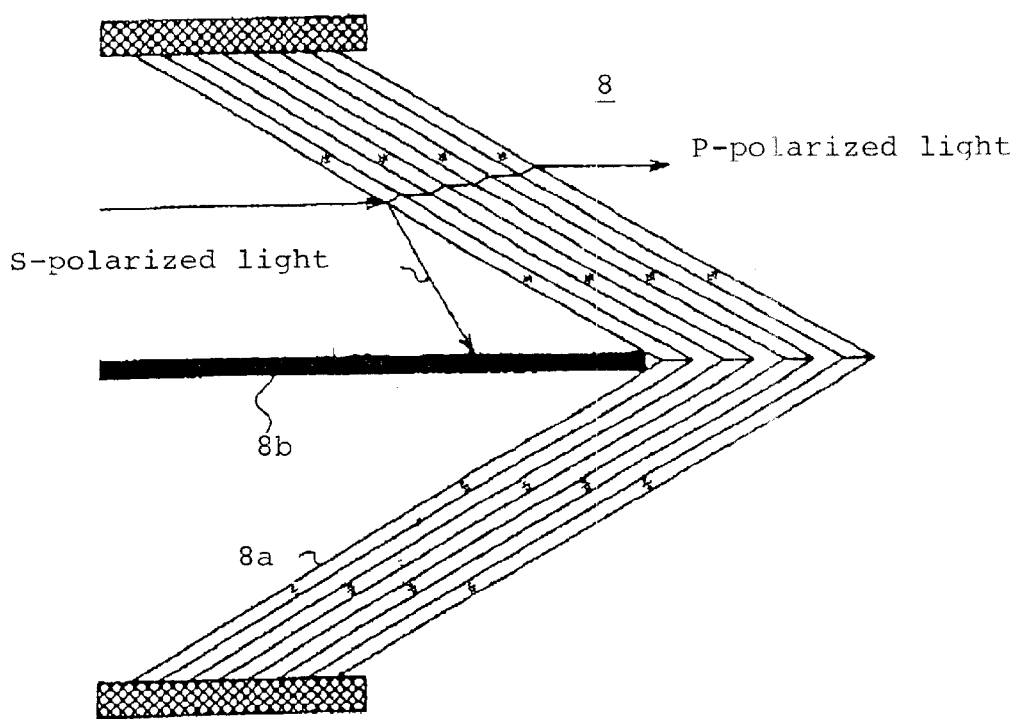
FIG. 1 is a schematic representation of one embodiment of the polarization element according to the invention.
Figure 10:
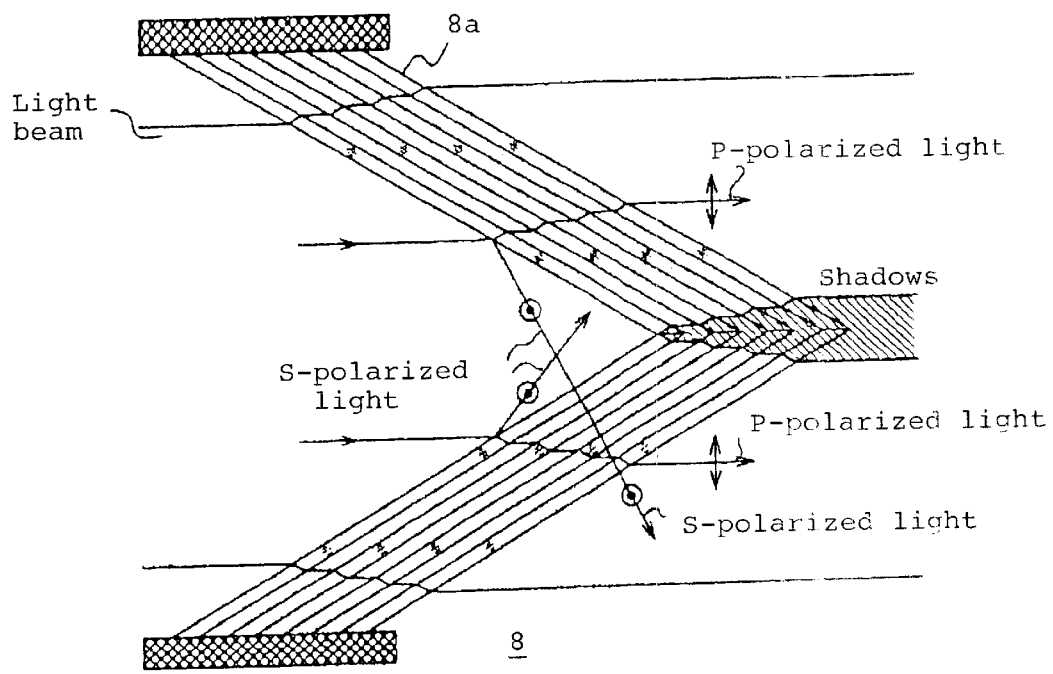
FIG. 10 is a schematic representation of a polarization element in which glass plates are combined with one another in a V-shape such that the light incidence side is convex.

FIG. 1 shows a first embodiment of a polarization element in accordance with the invention. It shows a case in which four sets of glass plates 8a are combined with one another in a V-shape to form a polarization element, as in FIG. 10. In fact, 15 sets of glass plates were used, as in FIG. 10, but only four sets are shown in FIG. 1 and the rest are omitted.

The respective glass plate 8a is inclined with respect to the incident light by the Brewster angle and is arranged such that the exit side becomes convex.

Figure 7:
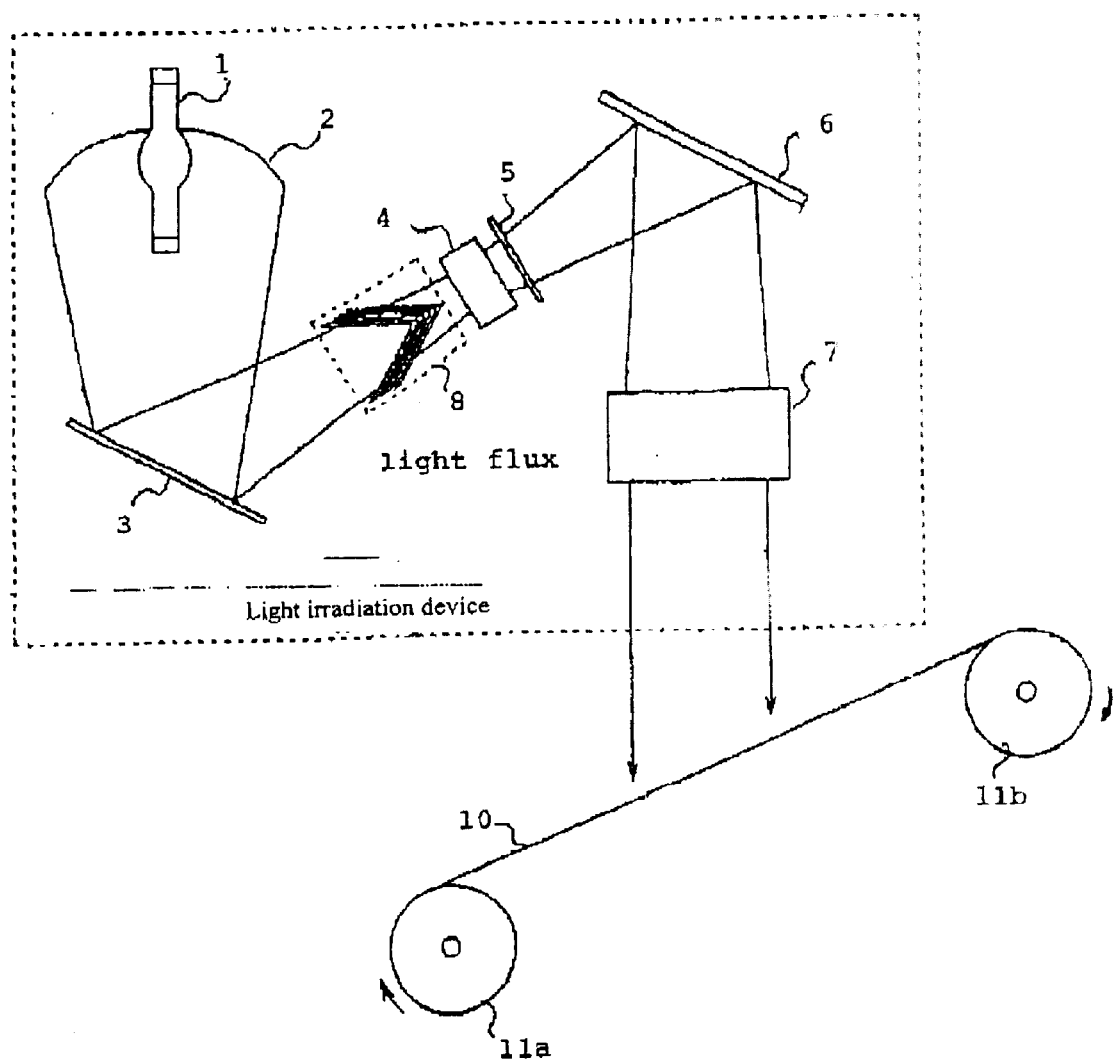
FIG. 7 is a schematic representation of one example of an irradiation device for polarized light for optical alignment of a wide-view film.
Figure 8:
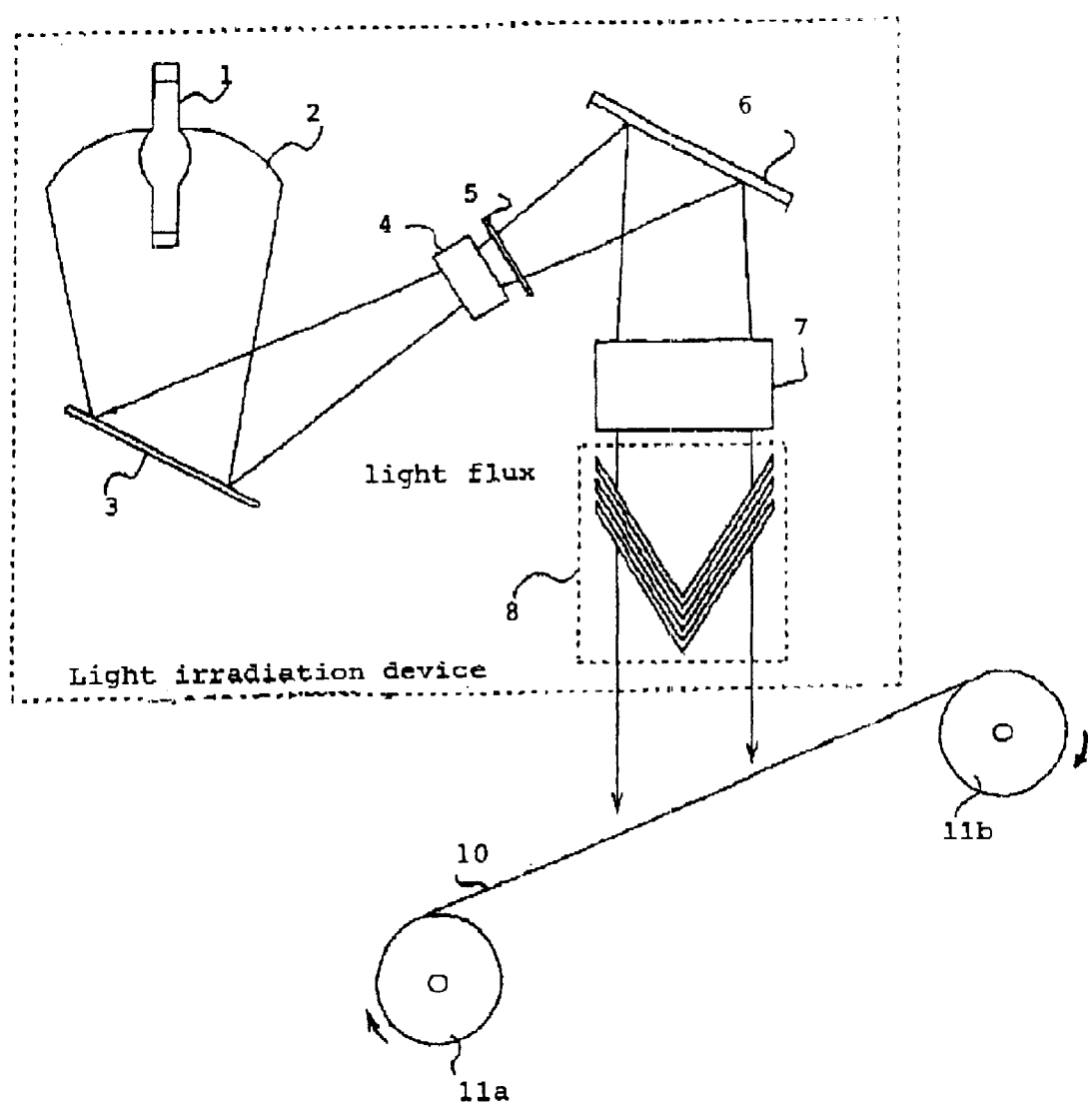
FIG. 8 is a schematic of an example of an arrangement of an irradiation device for polarized light for optical alignment of a wide-view film.
Figure 9:
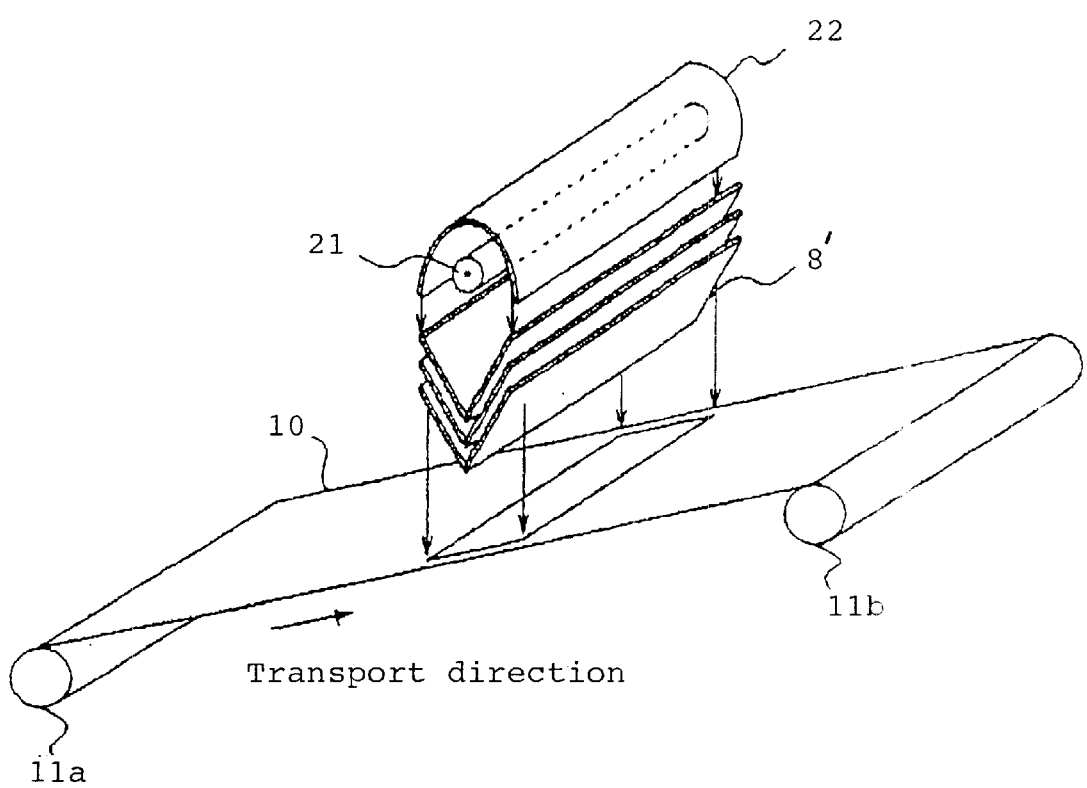
FIG. 9 is a schematic representation of another example of an arrangement of an irradiation device for polarized light for optical alignment of a wide-view film.

Only one polarization element with a light shielding plate is described below. However, the polarization element with a light shielding plate in the respective embodiment described below can be used as a polarization element of the irradiation device shown above in FIGS. 7 to 9 for polarized light.

In the polarization element with the above described arrangement, in this embodiment, there is a light shielding plate 8b for shielding the light which is reflected by the glass plate 8a which forms the polarization element 8, as shown in FIG. 1. This light shielding plate 8b is located along the connecting point of the glass plates which are combined with one another in a V shape to one side. The light shielding plate 8a is essentially parallel to the optical axis of the incident light beam such that the light incident in the glass plate 8a with the Brewster angle is not hindered.

The light shielding plate can, for example, be one which is produced such that an aluminum plate is treated with a black anodic oxide coating. The light reflected by the glass plate 8a is absorbed by this light shielding plate 8b.

By the arrangement of such a light shielding plate 8b, the S-polarized light reflected by the surface of the glass plate 8a is shielded by the light shielding plate 8b and is not incident in the opposite glass plate, as shown in FIG. 1. This increases the extinction ratio of the polarized light emerging from the polarization element when using 15 sets of glass plates, compared to the case in which there is no light shielding plate as shown above in FIG. 10, from 15:1 to 20:1.

In the above described embodiment, a flat light shielding plate was used. However, different shapes for the light shielding plate can also be used.

Figure 2:
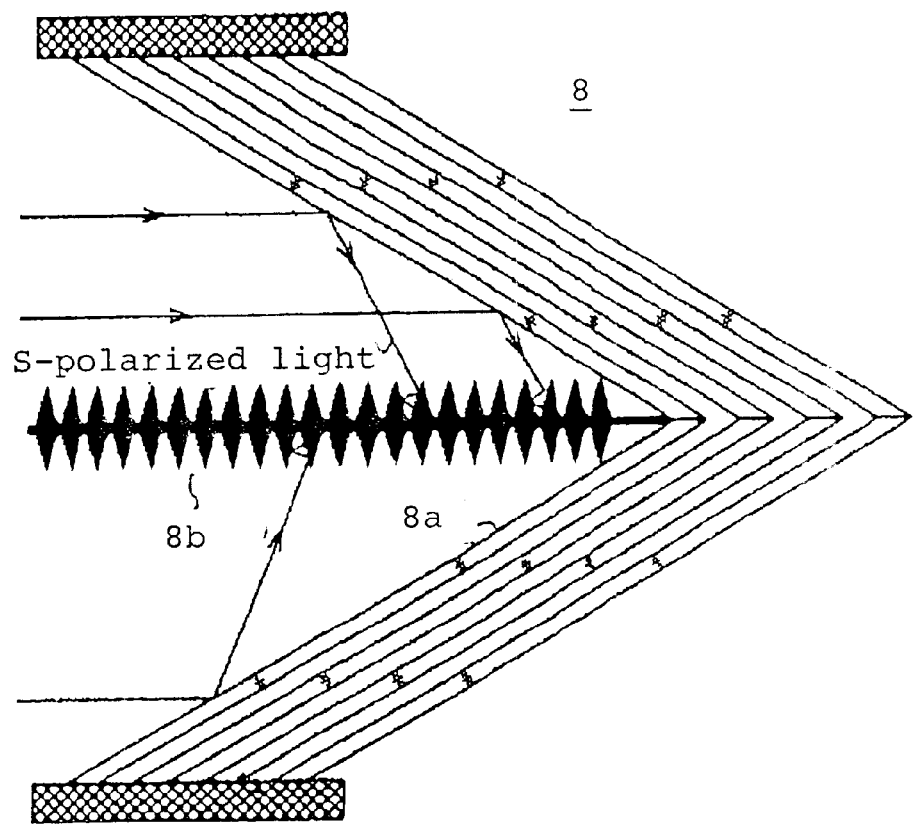
FIG. 2 a schematic representation of an embodiment in which a light shielding plate is used which has a surface which is formed with peaks.

FIG. 2 shows a case in which a light shielding plate 8b is used which has a surface with peaks. By using a light shielding plate with this shape, the light incident in the light shielding plate can be effectively absorbed (so-called knife-edge effect). The light shielding plate can not only be one which absorbs light, but a mirror can also be used.

Figure 3:
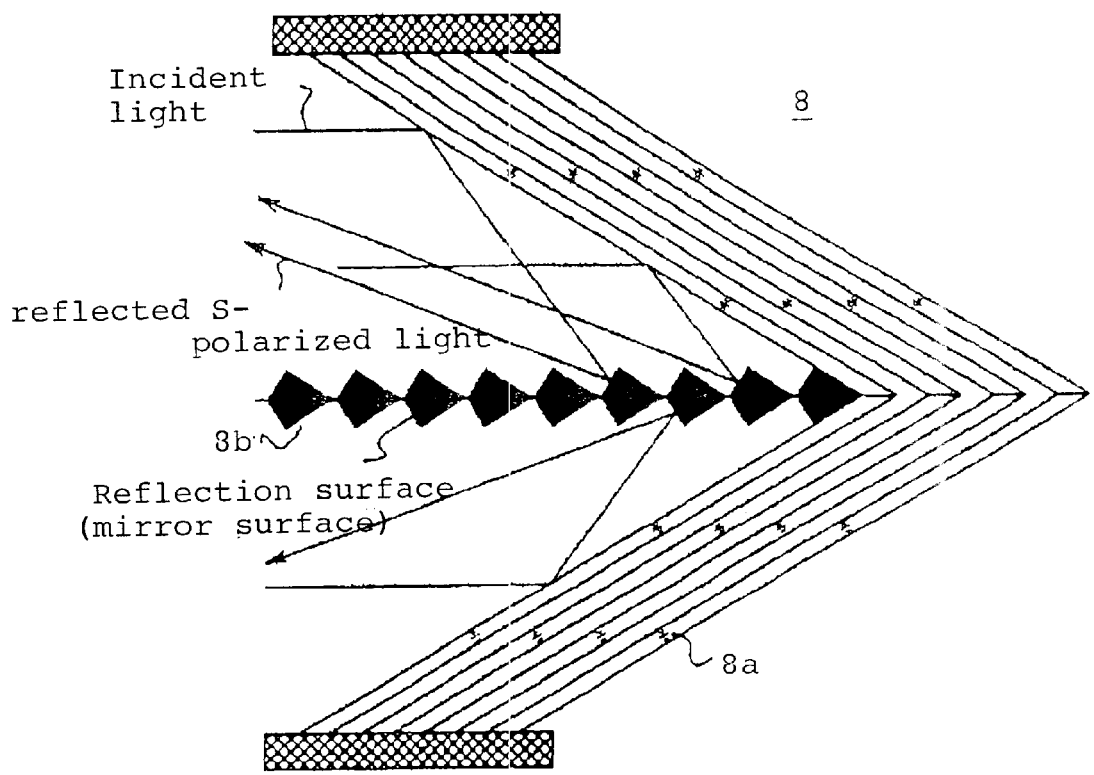
FIG. 3 is a schematic representation of an embodiment in which a light shielding plate is used which has a surface which is provided with a reflection surface.

FIG. 3 shows a case in which a light shielding plate is used with a surface which is provided with a reflection surface. As is illustrated in the drawings, the reflection surface of the light shielding plate is formed such that the S-polarized light reflected by the glass plate 8a is reflected in the direction in which it is not again incident in the glass plate 8a. By using a light shielding plate with such a reflection surface, the same effect as in FIG. 1 and FIG. 2 can be achieved.

It is most effective to arrange the light shielding plate 8b on the incidence side of the polarization element on which the intensity of the light reflected by the glass plate is great, as is shown in FIGS. 1 to 3. However, if this light shielding plate 8b is lengthened on the exit side and it is arranged between all the glass plates which form the V shape, the adverse effect on the extinction ratio can be reduced even more.

Figure 4:
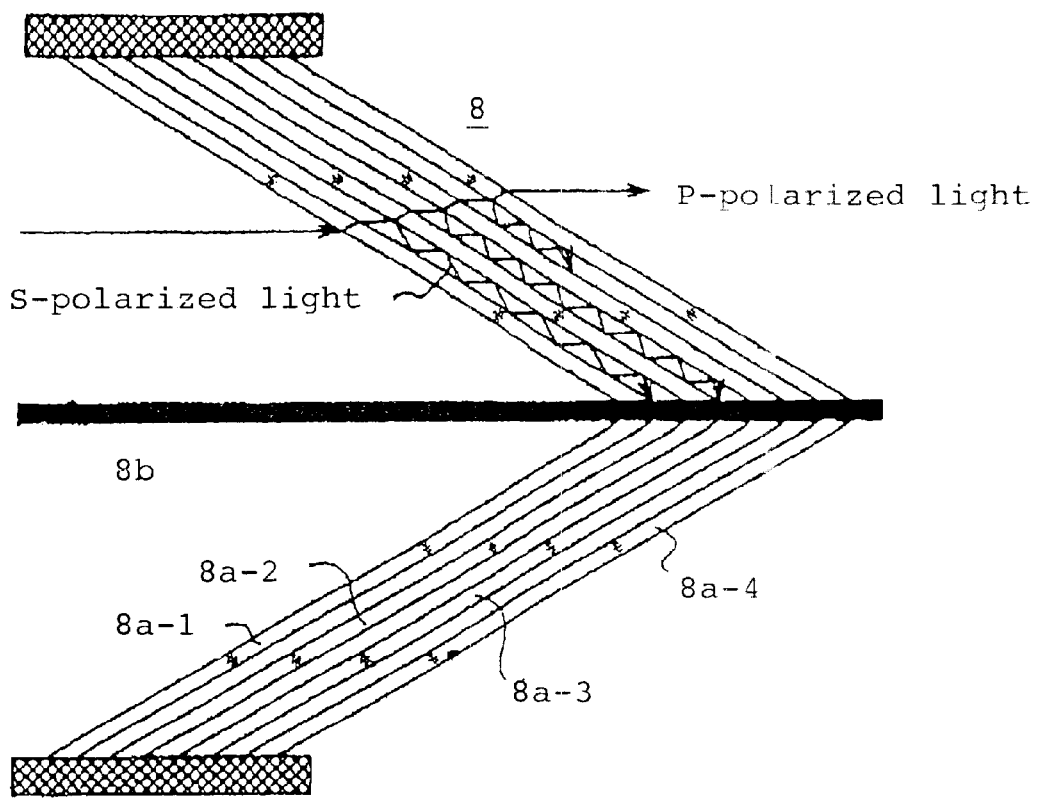
FIG. 4 is a schematic representation of an embodiment in which there is a light shielding plate between all glass plates.

When the light shielding plate is located not only on the incidence side of a glass plate 8a-1, but between a second glass plate 8a-2 of the polarization element, a third glass plate 8a-3 and a fourth glass plate 8a-4, the S-polarized light can also be shielded which is reflected by the surfaces of these glass plates, as is illustrated in FIG. 4. Therefore the adverse effect on the extinction ratio can be reduced even more.

The light shielding plate according to the invention absorbs the S-polarized light reflected by the glass plate 8a in full or in part, and there are cases in which it reaches a high temperature. In this case, it is advantageous to cool the light shielding plate using an air cooling means or a water cooling means.

The invention can be also be used for polarization elements with different shapes in which several polarization elements of the glass plates which have been combined in a V-shape are combined with one another.

Figure 5:
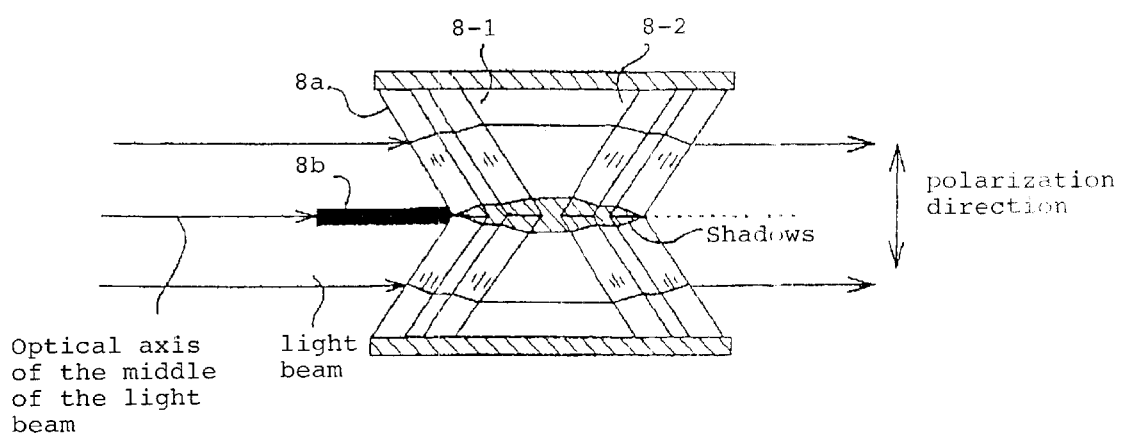
FIG. 5 is a schematic representation of one example of use for a polarization element with a different arrangement.

FIG. 5 shows a case in which a first polarization element 8-1 and a second polarization element 8-2 are used. In the first polarization element 8-1, glass plates are arranged such that the exit side becomes convex. In the second polarization element 8-2, glass plates are arranged such that the incidence side becomes convex. The first polarization element is located on the incidence side. The second polarization element is located on the exit side.

In this case, on the incidence side of the first polarization element 8-1, there is a light shielding plate, as was described above. In this way, the S-polarized light reflected by the glass plate of the polarization element 8-1 can be shielded, and thus, the reduction of the extinction ratio of the polarized light can be diminished, as was described above.

Figure 6:
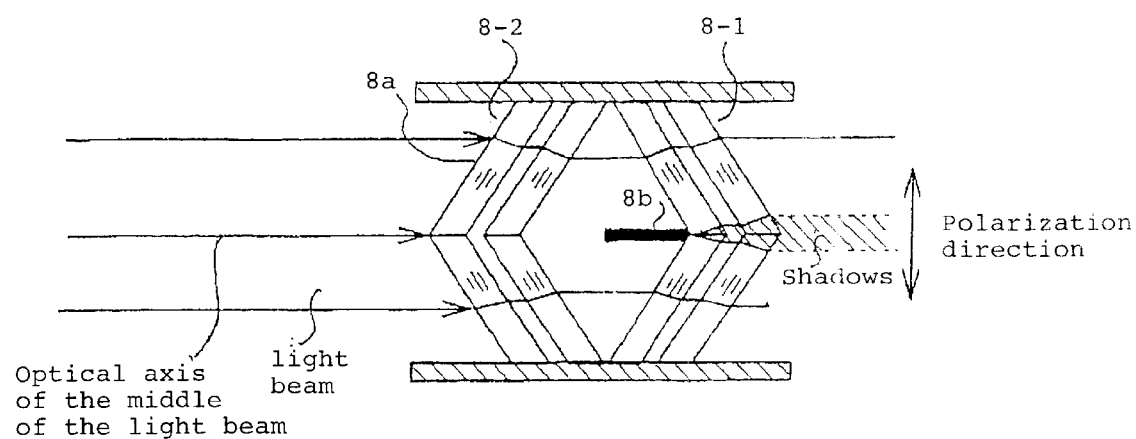
FIG. 6 is a schematic representation of one example of use for a polarization element with a different arrangement.

FIG. 6 shows a case in which the above described first polarization element 8-1 is located on the exit side and the second polarization element is located on the incidence side. In this case, on the incidence side of the first polarization element 8-1, there is a light shielding plate, as was described above. In this way, the S-polarized light reflected by the glass plate of the polarization element 8-1 can be shielded, and thus, the reduction of the extinction ratio of the polarized light can be diminished, as was described above.

In FIGS. 5 & 6, the light shielding plate located in the first polarization element 8-1 on the exit side can be lengthened in the manner described in FIG. 4 and it can be arranged between all glass plates which are combined with one another in a V shape, such that the exit side becomes convex.

Action of the Invention

As was described above, in accordance with the invention, on the light incidence side of the polarization element, there is a light shielding plate. Therefore, the following effects can be obtained.

(1) The S-polarized light which has been reflected by the surface of the glass plate is absorbed or reflected by the light shielding plate and is not incident in the opposite glass plate. Therefore, the S-polarized light which passes through the polarization element can be reduced and the extinction ratio of the polarized light emerging from the polarization element can be increased.

(2) By the arrangement of the above described light shielding component for each of the several glass plates which are combined with one another in a V-shape, the S-polarized light which is reflected by all the glass plates can be shielded. This increases the extinction ratio of the polarized light which emerges from the polarization element even more.

What we claim is:

1. Polarization element of an irradiation device for polarized light for optical alignment of a liquid crystal alignment layer which comprises:

a lamp;

a focusing mirror for focusing light from the lamp into a light beam having an optical axis; and a polarization element disposed on the optical axis of the light beam from the focusing mirror, wherein the polarization element comprises a plurality of glass plates inclined at the Brewster angle with respect to the optical axis of the light beam and arranged parallel to one another at spaced intervals, said glass plates being combined with one another into a V-shape which is convex at a light exit side thereof, wherein a light shielding component is disposed on a light incidence side of the polarization element along a center line of the V-shape, and wherein said light shielding component is essentially parallel to the optical axis of light incident on the polarization element such that light which is reflected by the glass plate is shielded.

2. Polarization element of an irradiation device for polarized light for optical alignment of a liquid crystal alignment layer as claimed in claim 1, wherein said light shielding component is provided for each of the glass plates which have been combined in a V-shape.

3. Polarization element of an irradiation device for polarized light for optical alignment of a liquid crystal alignment layer as claimed in claim 1, wherein the polarization element is a first of two polarization elements, a second of the two polarization elements being disposed downstream of the first polarization element in a direction of travel of the light beam, and comprising a plurality of glass plates inclined at the Brewster angle with respect to the optical axis of the light beam and arranged parallel to one another at spaced intervals, said second plurality of glass plates being combined with one another into a V-shape which is concave at a light exit side thereof.

4. Polarization element of an irradiation device for polarized light for optical alignment of a liquid crystal alignment layer as claimed in claim 1, wherein the polarization element is a first of two polarization elements, a second of the two polarization elements being disposed upstream of the first polarization element in a direction of travel of the light beam, and comprising a plurality of glass plates inclined at the Brewster angle with respect to the optical axis of the light beam and arranged parallel to one another at spaced intervals, said second plurality glass plates being combined with one another into a V-shape which is concave at a light exit side thereof.

5. Polarization element of an irradiation device for polarized light for optical alignment of a liquid crystal alignment layer as claimed in claim 3, wherein said light shielding component is provided for each of the glass plates which have been combined in a V-shape.

6. Polarization element of an irradiation device for polarized light for optical alignment of a liquid crystal alignment layer as claimed in claim 4, wherein said light shielding component is provided for each of the glass plates which have been combined in a V-shape.

* * * * *